United States Patent [19]

Higgins

[11] 4,153,431
[45] May 8, 1979

[54] PROCESS AND APPARATUS FOR CLEANING PRILLING TOWER EFFLUENT

[75] Inventor: John T. Higgins, Trail, Canada
[73] Assignee: Cominco Ltd., Vancouver, Canada
[21] Appl. No.: 840,316
[22] Filed: Oct. 7, 1977
[30] Foreign Application Priority Data
 Oct. 21, 1976 [CA] Canada .................................. 263866
[51] Int. Cl.² ............................................. B01D 47/06
[52] U.S. Cl. ........................................... 55/85; 55/89; 55/90; 55/96; 55/233; 55/242; 55/259
[58] Field of Search ................. 55/85, 89, 90, 96, 228, 55/233, 242, 259

[56] References Cited

U.S. PATENT DOCUMENTS

| | | | |
|---|---|---|---|
| 1,895,618 | 1/1933 | Fedeler | 55/228 |
| 2,108,248 | 2/1938 | Bichowsky | 55/228 |
| 2,970,671 | 2/1961 | Warner | 55/242 |
| 2,997,132 | 8/1961 | Allander et al. | 55/90 |
| 3,134,825 | 5/1964 | Sexton | 55/259 |
| 3,135,592 | 6/1964 | Fairs et al. | 55/90 |
| 3,142,548 | 7/1964 | Krantz | 55/89 |
| 3,370,401 | 2/1968 | Lucas et al. | 55/90 |

FOREIGN PATENT DOCUMENTS

| | | | |
|---|---|---|---|
| 7700639 | 2/1976 | Netherlands | 55/90 |
| 1416478 | 12/1975 | United Kingdom | 55/242 |

OTHER PUBLICATIONS

T. Takae and K. Akitsune, Abatement of Prilling Tower Effluent, 6/1973, pp. 72-78, Chemical Engineering Progress (vol. 69, No. 6).

Primary Examiner—Frank W. Lutter
Assistant Examiner—David L. Lacey
Attorney, Agent, or Firm—Wenderoth, Lind & Ponack

[57] ABSTRACT

Process and apparatus for removing particulate material from a dust laden gas exhausting from the top of a prilling tower which comprises passing the dust laden gas through an aqueous scrubbing liquid spray and thence through a filter onto which the scrubbing liquid spray impinges in co-current flow with the gas, thus maintaining the filter in a continuously wetted and irrigated state, and passing cleaned gas from the top of the tower.

12 Claims, 1 Drawing Figure

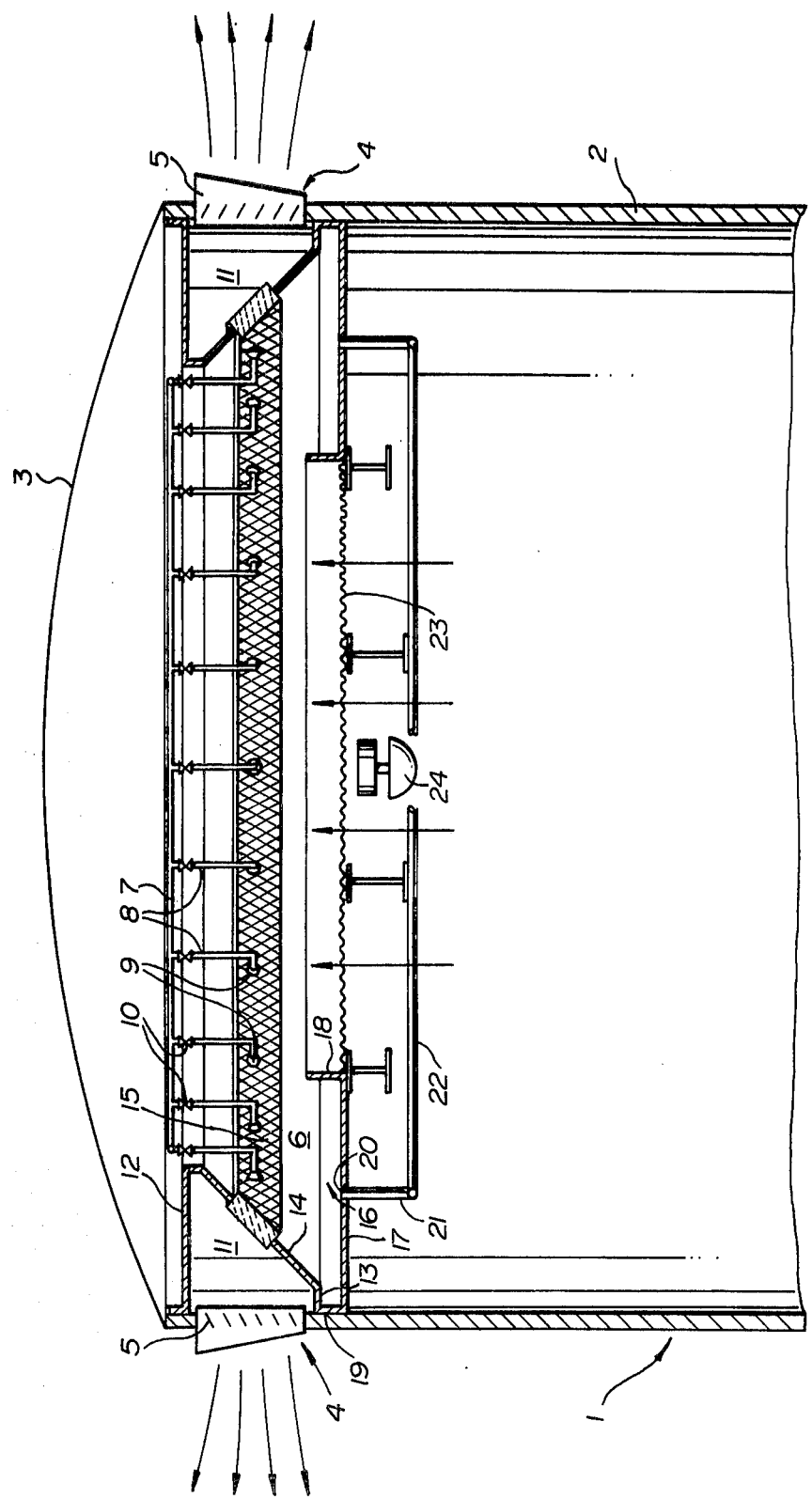

PROCESS AND APPARATUS FOR CLEANING PRILLING TOWER EFFLUENT

BACKGROUND OF THE INVENTION

This invention relates to a wet gas scrubber and more particularly, to a method and apparatus for the wet scrubbing of gaseous prilling-tower effluent.

Prilling towers are well known in the fertilizer industry for the production of particulate chemical and fertilizer products such as ammonium nitrate, urea and mixed fertilizers. A hot, concentrated solution or melt is sprayed downwardly against a rising stream of air. Sprays of the solution or melt solidify and particulates are collected from the bottom of the prilling tower. Hot air is exhausted from the top of the tower into the atmosphere. The spraying of solutions or melts results in formation of particulates which are mostly large enough to fall against the rising stream of air. However, particulates which are too small to fall against the rising air will be carried with the air from the tower into the atmosphere where they form a mist or fume which causes visible pollution.

It is desirable that this pollution be abated. To do this, the prilling-tower effluent must be cleaned before being released to the atmosphere. To accomplish this, scrubbing of gaseous prilling-tower effluent appears to be the most economical method which not only eliminates pollution but enables recovery of at least a portion of the chemical or fertilizer product which has been entrained in the exhaust air from the prilling tower.

Various proposals have been made whereby the desired cleaning of the exhausting gas may be activated.

In one proposed system, a modified cyclone-type scrubber is built directly onto the top of the tower. Water is used as the scrubbing liquid. This system has the disadvantages of being expensive, complex, and of difficult maintenance.

Another system that has been proposed contemplates returning the exhaust gas, through suitable ducting, to the bottom of the tower. A conventional wet gas scrubber is used to clean the recirculated gas. This procedure has the disadvantages again of cost and complication.

It has also been proposed to remove the particulate fume causing the pollution by various filtering procedures, either using dry or wet filtering media. When used dry, these media have the disadvantage that they eventually clog, and must be replaced. It is inherent in the filtering process that this must happen.

It has been proposed to use a wet filter system. Such a system is described by Akitsune and Takae, in Chemical Engineering Progress, Volume 69, at pages 72 to 78 (the issue of June, 1973). In the described system the exhausting air is first washed by liquid from a spray system at the top of a prilling tower, and then passed through the filters. The device is so arranged that the spray water and exhaust air are flowing counter-currently, but this inevitably means that the only liquid to reach the filters to wet them is that carried along by the air currents. Indeed Akitsune and Takae specifically advocate limiting the amount of water reaching the filter: too little causes it to run dry and clog, whereas too much causes an unacceptably high pressure drop. In a forced ventilation tower the velocity can be enough to carry over a significant amount of liquid, but in a natural draft tower the air velocities are much lower, and the liquid carry-over is substantially less. Thus although this system has the advantages of comparative simplicity, compact size and decreased load on the filters, this system still has the important disadvantage that, in time, the filters become clogged. Indeed the filter is almost operating as a mist eliminator, but, since the mist being eliminated contains entrained dust particles, it gets clogged. Such clogging causes increased pressure drop in the tower, which is a major operating disadvantage for both natural draft and forced ventilation towers. This system, therefore, is not suitable for a natural draft tower.

SUMMARY OF THE INVENTION

It has now been found that the top of a prilling tower or the like can be modified to accomodate a wet scrubbing device which overcomes many of these problems.

Thus in a first aspect this invention provides a process for removing particulate material from a dust laden gas exhausting from the top of a prilling tower which comprises passing the dust laden gas through an aqueous scrubbing liquid spray and thence through a filter, onto which the scrubbing liquid spray impinges, in co-current flow with the gas, thus maintaining the filter in continuously wetted and irrigated state, and passing cleaned gas from the top of the tower.

Preferably the aqueous scrubbing liquid is water or an aqueous solution which is conveniently recirculated and reused. Thus the scrubbing liquid is conveniently a solution in water of the soluble material from the dust being removed. When a recirculation system is used, it is preferred that a bleed and make-up system be used, whereby solution is removed to recover its solutes, and replaced by fresh, or depleted, makeup water or solution.

In a second aspect this invention provides an apparatus for removing the dust from dust laden gas exhausting from the top of a prilling tower comprising spraying means adapted to inject into the flowing dust laden gas an aqueous scrubbing liquid; filter means adapted to collect the dust entrained in the flowing gas, so sited as to be continuously wetted and irrigated by the scrubbing liquid injected into the flowing gas by the spraying means; collection means disposed to collect the dust laden liquid run-off from the filter means; and pipe means to conduct the liquid run-off from the collection means.

Preferably the filter means comprises a substantially continuous toroidal ring of filters adjacent to the outer wall at the top of the tower, and the spraying means comprises a series of jets or sprays feeding from a common main, located radially inwardly toward the center of the tower from the toroidal ring of filters, and directed radially outwardly towards the ring of filters.

Preferably, to facilitate spray liquid run-off, the filters are inclined inwardly, with their top nearer to the spray means than their bottom. An inclination from the vertical of between 30° and 60°, preferably about 45°, has been found to be satisfactory.

Preferably the collection means comprises a channel, of suitable width, disposed below and adjacent to the filters. The run-off collecting therein can be removed in any convenient way and conducted out of the tower.

DETAILED DESCRIPTION OF THE INVENTION

The invention will be described with reference to the accompanying drawing, which illustrates a typical embodiment of this invention. The drawing depicts a sectional view of the top section of a prilling tower containing the wet scrubber. The various arrows indicated the direction of flow of the exhausting air.

In the drawing, the top section of the prilling tower is generally indicated at 1 and comprises a cylindrical wall 2, and a dished-, or dome-shape top 3. Openings 4 are provided in cylindrical wall 2 below top 3 to enable the exhausting air to leave the prilling tower. Openings 4 are spaced equidistant around the tower circumference and are usually of a configuration that excludes atmospheric disturbances, such as wind and rain, from the tower. The openings are usually provided with louvres 5. The number and dimensions of openings 4 are such that gas flow from the tower is not impeded.

The wet scrubber, which is generally indicated at 6, is situated slightly below top 3. Exhausting air has to pass through the wet scrubber before venting from the tower through the openings 4. Scrubber 6 has a toroidal shape and includes means for spraying liquid, means for collecting liquid and means to eliminate liquid and particulates from the air being exhausted.

The spraying means are located just below top 3 of the tower and comprise a ring-shaped header 7 and a number of equispaced, vertically positioned pipes 8 suspended from and connected to header 7 which end in spray nozzles 9. The spray nozzles are radially outwardly directed. Header 7 is connected to a feed pipe (not shown) for supplying scrubbing liquid. Each of the pipes 8 may contain a control or shut-off valve 10.

The elimination means for liquid and solids from the air are located around and against the inside of cylindrical wall 2 and comprise a continuous, ring-shaped box generally indicated at 11. Box 11 has a generally inverse-trapezoid-shaped cross-section and is positioned against the inside of the wall of the tower in such a manner that the outer side of the trapezoid is formed by the wall of the tower and includes the openings 4 in cylindrical wall 2. Box 11 consists of an upper plate 12, a lower plate 13 and an inclined inner plate 14. Upper plate 12 and lower plate 13 are generally perpendicular to cylindrical wall 2. The inclination of inner plate 14 may be in the range of 30° to 60° but is preferably about 45°. Inner plate 14 contains filter means 15. Filter means 15 extend continuously around the tower forming a toroidal filter, radially outward of spray nozzles 9. The filters are mounted in and supported by inner plate 14. Filter means 15 are made of a suitable pervious material, for example fiber glass, or a synthetic resin in one or more pieces or elements.

The collecting means serve to collect liquid which drains from box 11. Most liquid drains from filter means 15, but any liquid that passes through filter means 15 collects in box 11 and drains through apertures (not shown) provided in its lower plate 13. The apertures are designed so that a liquid seal is maintained, which prevents dust laden gas from the tower short-circuiting past the filter means 15. The collecting means are supported in the tower just below box 11 and include an annular collecting tray 16. Tray 16 comprises a substantially horizontal bottom 17, an inner edge 18 and an outer edge 19. Bottom 17 contains a number of openings 20, preferably equispaced and centrally located in the annular collecting tray bottom for drainage of collected liquid. Bottom 17 is preferably slightly dished or sloped toward openings 20 to facilitate drainage of liquid. Down pipes 21 are connected to openings 20 to convey liquid to a circular collection header 22, whence liquid flows to a drain pipe for liquid (not shown) for conveyance elsewhere, for example to a re-circulation system.

A circular grating 23 occupies the central opening in anular tray 16. Grating 23 permits unhindered passage of air flowing upwardly through the tower. A spinner or spray nozzle 24, for spraying solution or melt of the chemical or fertilizer to be prilled is positioned on the tower centre-line just below grating 23.

The wet scrubber described above, with reference to the accompanying drawing, is a preferred embodiment of the invention. This embodiment has a number of advantages. The scrubber is located inside the tower which enables the liquid for the scrubber to be maintained above its freezing point or the crystallization point of its constituents by the passing hot air. This is especially advantageous under cold climatic conditions.

The scrubber can be installed in existing prilling towers with only minor modifications.

It is to be understood that other embodiments are posible. For example, a toroidal scrubber, containing the same or similar elements as the one described above as a preferred embodiment, may be mounted at the top of, but outside, a prilling tower. Such embodiment would permit lower air velocities in the scrubber and lower velocities of the air being exhausted from the tower. Such embodiments would also be advantageous for small prilling towers.

In the operation of a prilling tower, a hot solution or melt of one or more chemical or fertilizer compounds, such as, for example, urea, ammonium nitrate, or mixtures thereof, is pumped to spinner 24 and dispersed into a rising flow of air which cools the dispersed solution or melt to the solid state. The air is admitted to the bottom of the tower either under natural draft conditions or by a blower. The air may be cooled, heated, or at ambient conditions, as required. The air entrains finely divided particulates, passes through grating 23 and is wetted by the liquid emitted by the sprays 9 in the scrubber.

In the wet scrubber, a suitable liquid such as water or a solution of one or more of the compounds being prilled is pumped from a reservoir at the bottom of the tower to ring header 7 and through pipes 8 and nozzles 9 into the air and onto filter means 15. The flow of liquid may be regulated with valves 10 and controlled in relation to the amount of air which flows through the tower. If so desired, a number of valves 10 may be closed. The liquid wets the particulates entrained in the air and the wetted solids collect on filter means 15 whence liquid and particulates wash down the drain into collecting tray 16. The air, now scrubbed of particulates passes through louvered openings 4 into the atmosphere. In warm weather no visible emission occurs from the prilling tower while in colder weather only steam is emitted which readily disperses without causing pollution.

Liquid collected in tray 116 drains through openings 20, down pipes 21 and collection header 22 and flows away through the drainpipe for liquid (not shown), for example, to a reservoir at the bottom of the tower. Fresh liquid may be supplied to the reservoir, while a portion of liquid may be removed from the reservoir for recovery of dissolved chemical or fertilizer compound or compounds.

Air velocities in a prilling tower vary with the use of natural-draft, induced-draft or forced-draft air. For example, air velocities in the main body of a tower may be in the range of 0.4 to 1.5 m/sec. those through the grating may be in the range of 1 to 4 m/sec. and those of the air leaving the tower may be in the range of 3 to 10 m/sec. The pressure drop over the filter elements is usually in the order of 0.3 to 3 cm water gauge.

What is claimed is:

1. Process for removing particulate material from a dust laden gas exhausting from the top of a prilling tower, which comprises passing the dust laden gas through an aqueous scrubbing liquid spray and thence through a filter while simultaneously directing the scrubbing liquid spray against the filter in the same direction as the flow of the gas for maintaining the filter in a continuously wetted and irrigated state, and passing cleaned gas from the downstream side of the filter out of the top of the tower.

2. Process according to claim 1 wherein the dust has at least one water soluble constituent and the scrubbing liquid is chosen from water or an aqueous solution of said constituent of the dust.

3. Process according to claim 2 wherein the scrubbing liquid is recycled.

4. Process according to claim 3 wherein at least some of the recycled scrubbing lliquid is treated to recover the solutes therefrom.

5. In combination, a prilling toward having a cylindrical wall adjacent to the top of the tower and having exhaust means therein, and apparatus for removing dust from a dust laden gas exhausting from the top of the prilling toward, said apparatus comprising (1) a filter means for separating from flowing gas both dust and an aqueous scrubbing liquid, said filter means being mounted in the top of said tower adjacent said cylndrical wall and dividing the interior of said tower from the exhaust means and having an upper end closer to the center of said prilling tower than the lower end, (2) spraying means in said tower on the opposite side of said filter means from said exhaust means and for injecting an aqueous scrubbing liquid into flowing dust laden gas in the same direction as the flow of gas and for directly impinging at least a part of the injected aqueous scrubbing liquid against said filter means for continuously irrigating said filter means, and (3) collection means disposed beneath and adjacent said filter means and adapted to collect dust laden aqueous scrubbing liquid which runs off said filter means.

6. Apparatus according to claim 5 wherein said filter means comprises a substantially continuous toroidal ring of filters adjacent to said cylindrical wall at the top of said tower, and said spraying means comprises a series of jets or sprays located radially inwardly toward the center of said tower from said toroidal ring of filters, and adapted to direct a spray of scrubbing liquid substantially radially outwardly onto said filters.

7. Apparatus according to claim 6 wherein said filter means is inclined means, at an inclination from the vertical of from about 30° to about 60°.

8. Apparatus according to claim 6 wherein said collection means comprises a channel of suitable width, below and adjacent to the bottom of said filter means.

9. Apparatus according to claim 6 in which said filter means is a fiber glass or foamed synthetic resin unit.

10. Apparatus according to claim 5 wherein said filter means is inclined at an inclination from the vertical of from about 30° to about 60°.

11. Apparatus according to claim 5 wherein said collection means comprises a channel of suitable width, below and adjacent to the bottom of said filter means.

12. Apparatus according to claim 5 in which said filter means is a fiber glass or foamed synthetic resin unit.

* * * * *

Disclaimer 4,153,431.—*John T. Higgins*, Trail, Canada. PROCESS AND APPARATUS FOR CLEANING PRILLING TOWER EFFLUENT. Patent dated May 8, 1979. Disclaimer filed July 22, 1980, by the assignee, *Cominco, Ltd.*

Hereby enters this disclaimer to claims 1–4 of said patent.

[*Official Gazette September 9, 1980.*]